(12) United States Patent
Harvey et al.

(10) Patent No.: US 8,757,554 B1
(45) Date of Patent: Jun. 24, 2014

(54) DEPLOYABLE AND TRACKED SOLAR ARRAY MECHANISM FOR NANO-SATELLITES

(75) Inventors: Thomas Jeffrey Harvey, Nederland, CO (US); Matthew John DeVito, Nederland, CO (US)

(73) Assignee: MMA Design, LLC, Boulder, CO (US)

( * ) Notice: Subject to any disclaimer, the term of this patent is extended or adjusted under 35 U.S.C. 154(b) by 605 days.

(21) Appl. No.: 12/807,565

(22) Filed: Sep. 8, 2010

Related U.S. Application Data

(60) Provisional application No. 61/276,197, filed on Sep. 9, 2009.

(51) Int. Cl.
*B64G 1/44* (2006.01)
(52) U.S. Cl.
USPC ..................................... 244/172.9; 244/172.7
(58) Field of Classification Search
USPC ......... 244/172.6, 172.7, 172.9; 136/243, 244, 136/245, 246
See application file for complete search history.

(56) References Cited

U.S. PATENT DOCUMENTS

| | | | | |
|---|---|---|---|---|
| 3,677,508 A | * | 7/1972 | Dillard et al. | 244/172.7 |
| 3,733,758 A | * | 5/1973 | Maier et al. | 52/113 |
| 4,148,163 A | * | 4/1979 | Chenin et al. | 52/71 |
| 4,155,524 A | * | 5/1979 | Marello et al. | 244/172.6 |
| 5,319,905 A | * | 6/1994 | Szirtes | 52/108 |
| 5,520,747 A | * | 5/1996 | Marks | 136/245 |
| 5,785,280 A | * | 7/1998 | Baghdasarian | 244/172.6 |
| 5,885,367 A | * | 3/1999 | Brown et al. | 136/245 |
| 5,927,654 A | * | 7/1999 | Foley et al. | 244/172.6 |
| 6,008,447 A | * | 12/1999 | Meurer et al. | 136/245 |
| 6,017,002 A | * | 1/2000 | Burke et al. | 244/172.8 |
| 6,050,526 A | * | 4/2000 | Stribling, Jr. | 244/172.8 |
| 6,429,368 B1 | * | 8/2002 | Summers | 136/245 |
| 6,655,638 B2 | * | 12/2003 | Deel | 244/172.8 |
| 6,888,513 B1 | * | 5/2005 | Graham et al. | 343/880 |

(Continued)

OTHER PUBLICATIONS

Clyde-Space; 1U Single Deployed Solar Panel (short edge), <www.clyde-space.com/cubesat_shop/solar_panels>. Circa 2008?.*

(Continued)

*Primary Examiner* — Tien Dinh
*Assistant Examiner* — Michael A Fabula
(74) *Attorney, Agent, or Firm* — Christopher J. Kulish

(57) ABSTRACT

A deployable and tracked solar array mechanism for restraining and releasing deployable solar panel arrays on a spacecraft is provided. The mechanism comprises a solar array drive mountable to the top side surface of the spacecraft. A solar panel array is pivotally attached to the solar array drive and positionable against the spacecraft. At least one notch is formed in at least one of the side edges of the solar panel array. A frame is slidably mounted to the spacecraft around the solar panel array. At least one tab extends from the frame over the solar panel array and releasably restrains the solar panel array. A spring mechanism urges the frame in a direction generally away from the solar array drive assembly. A release mechanism holds the frame against the force of the spring means wherein upon initiation of deployment, the release mechanism disintegrates allowing the spring means to slidably urge the frame in a general direction away from the solar array drive assembly thereby aligning the at least one notch with the at least one tab and releasing the solar panel array from against the spacecraft.

20 Claims, 7 Drawing Sheets

(56) References Cited

U.S. PATENT DOCUMENTS

| | | | | |
|---|---|---|---|---|
| 7,211,722 | B1* | 5/2007 | Murphy | 136/245 |
| 7,278,612 | B1* | 10/2007 | Munder | 244/172.6 |
| 7,806,370 | B2* | 10/2010 | Beidleman et al. | 244/172.7 |
| 8,035,573 | B2* | 10/2011 | Thompson et al. | 343/881 |
| 8,061,660 | B2* | 11/2011 | Beidleman et al. | 244/172.7 |
| 8,066,227 | B2* | 11/2011 | Keller et al. | 244/172.7 |
| 8,308,111 | B2* | 11/2012 | Lu et al. | 244/172.7 |
| 2005/0156083 | A1* | 7/2005 | Chaix et al. | 244/158 R |
| 2007/0262204 | A1* | 11/2007 | Beidleman et al. | 244/172.6 |
| 2010/0163684 | A1* | 7/2010 | Dando et al. | 244/172.6 |
| 2011/0204186 | A1* | 8/2011 | Keller et al. | 244/172.6 |
| 2012/0024342 | A1* | 2/2012 | Kalman | 136/245 |
| 2012/0325974 | A1* | 12/2012 | Baudasse et al. | 244/172.6 |

OTHER PUBLICATIONS

Wikipedia; Planetary Society LightSail-1; <http://en.wikipedia.org/w/index.php?oldid=530006872>; Circa 2008.*

Conversano et al.; CubeSat Lunar Mission Using a Miniature Ion Thruster; Department of Mechanical and Aerospace Engineering, University of California, Los Angeles.*

Conversano et al.; CubeSat Lunar Mission Using a Miniature Ion Thruster; Department of Mechanical and Aerospace Engineering, University of California, Los Angeles; 47th AIAA/ASME/SAE/ASEE Joint Propulsion Conference and Exhibit Jul. 31-Aug. 3, 2011.*

* cited by examiner

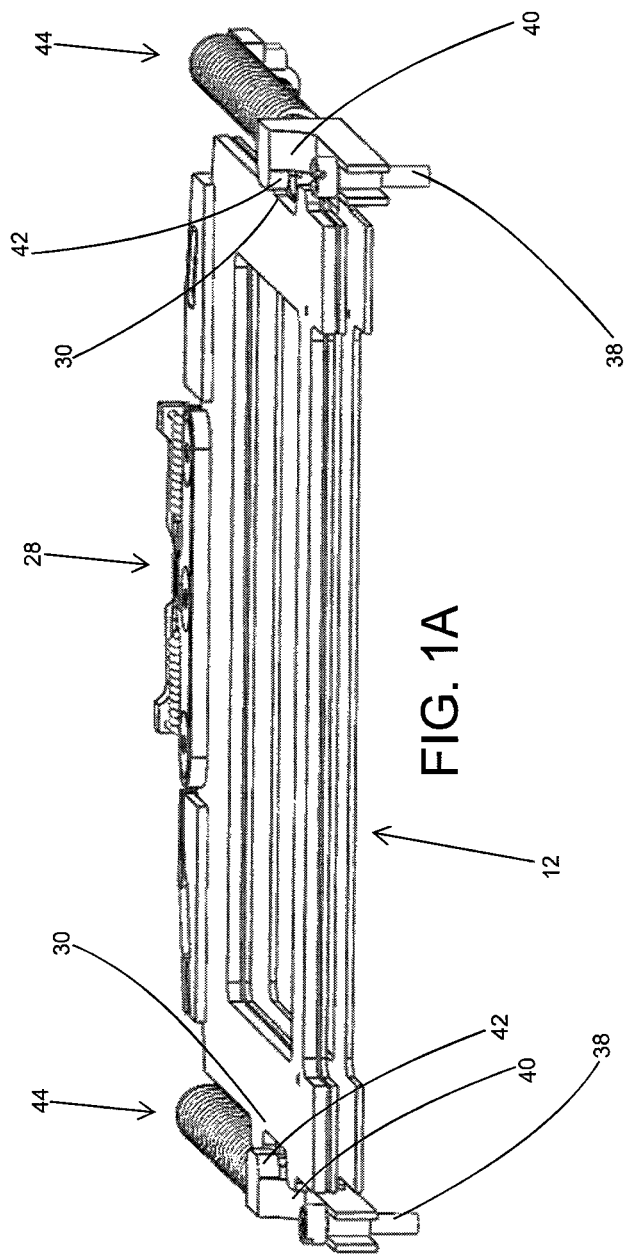

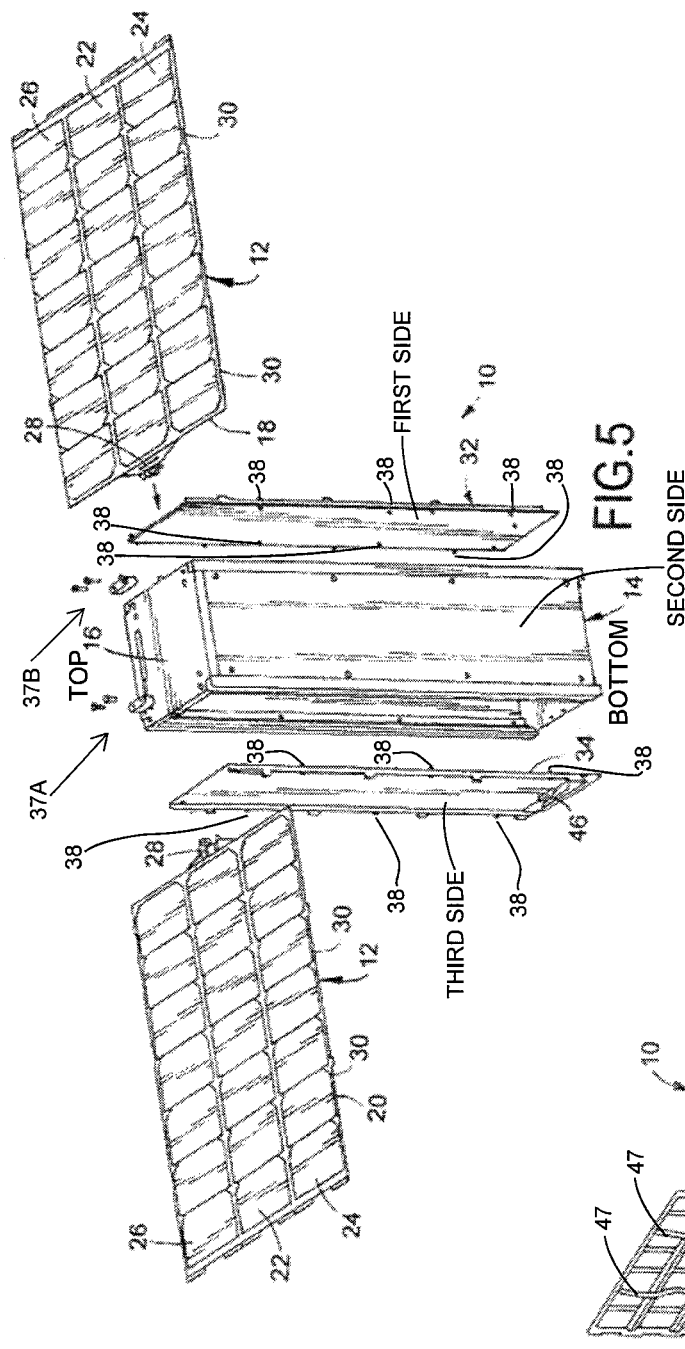
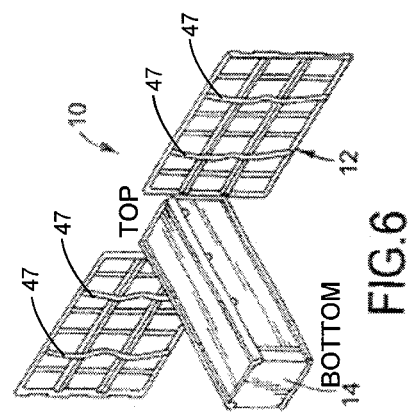

DEPLOYABLE AND TRACKED SOLAR ARRAY MECHANISM FOR NANO-SATELLITES

The present application claims benefit of priority of provisional patent application Ser. No. 61/276,197, filed on Sep. 9, 2009, entitled "CubeSat Tracked Solar Array".

BACKGROUND OF THE INVENTION

1. Field of the Invention

This invention relates generally to a deployable and tracked solar array mechanism for nano-satellites and, more particularly, the invention relates to a deployable and tracked solar array mechanism for nano-satellites for a wrap-folded solar wing formed with a frame that restrains the lengthwise edges of a center panel of the solar wing on each side prior to deployment.

2. Description of the Prior Art

CubeSats are small spacecraft often 10 cm×10 cm×30 cm. Existing CubeSat deployable solar array panels hinge from all four 30 cm bus faces in a maximum power configuration. While this yields the maximum area of cells, the structural architecture is not well suited to sun tracking and hence its Average Orbital Power (AOP) is severely limited due to non-optimal pointing during the majority of an orbit. The peak power of the existing State Of The Art (SOTA) CubeSat systems is 21 watts. When sun off pointing is factored in to obtain an Average Orbital Power (AOP), the power in a nadir pointing mission drops to 5 to 7 watts AOP.

In addition, restraining the solar array panels during liftoff, flight, and positioning of the spacecraft and deploying the solar array panels when ready presents numerous problems. It is of utmost importance to protect the solar array panels and to reliably release the solar array panels when desired. Due to the fact that the spacecraft is orbiting the Earth, it is not possible to "fix" any solar array panels or release mechanisms after the spacecraft is in orbit.

SUMMARY

The present invention is a deployable and tracked solar array mechanism for restraining and releasing deployable solar panel arrays on a spacecraft. The mechanism comprises a solar array drive mountable to the top side surface (10 cm×10 cm) of the spacecraft. A solar panel array panel is pivotally attached to the solar array drive and positionable against the 30 cm×10 cm faces of the spacecraft. At least one notch is formed in at least one of the side edges of the solar panel array. A frame is slidably mounted to the spacecraft around the solar panel array. At least one tab extends from the frame over the solar panel array and releasably restrains the solar panel array. A spring mechanism urges the frame in a direction generally away from the solar array drive assembly. A release mechanism holds the frame against the force of the spring means wherein upon initiation of deployment, the release mechanism disintegrates allowing the spring means to slidably urge the frame in a general direction away from the solar array drive assembly thereby aligning the notches (at least one) with the frame tab thus releasing the solar panel array from being restrained against the spacecraft.

In addition, the present invention includes a method for restraining and releasing deployable solar panel arrays on a spacecraft. The method comprises mounting a solar array drive assembly to the top side surface of the spacecraft, providing a solar panel array having a center panel, pivotally attaching a first panel to one side edge of the center panel, pivotally attaching a second panel to the other side edge of the center panel opposite the first panel, pivotally attaching the center panel to the solar array drive assembly, positioning, the solar panel array against the spacecraft, forming at least one notch in at least one of the side edges of the solar panel array, slidably mounting a frame to the spacecraft around the solar panel array, extending at least one tab from the frame over the solar panel array, releasably restraining, the solar panel array with the at least one tab, urging the frame in a direction generally away from the solar array drive assembly, holding the frame against the force of movement, initiating deployment, releasing the hold on the frame, slidably urging the frame in a general direction away from the solar array drive assembly, aligning the at least one notch with the at least one tab, and releasing the solar panel array from against the spacecraft.

The present invention further includes a deployable and tracked solar array mechanism for restraining and releasing deployable solar panel arrays on a spacecraft. The spacecraft has a first side surface, a second side surface, a third side surface opposite the first side surface, a fourth side surface opposite the second side surface, a top surface, and a bottom surface. The mechanism comprises a solar array drive assembly mountable to the top side surface of the spacecraft. A first solar panel array and a second solar panel array are provided with each solar panel array having a center panel, a first panel pivotally attached to one side edge of the center panel, and a second panel pivotally attached to the other side edge of the center panel opposite the first panel. The center panels are pivotally attached to opposite sides of the solar array drive assembly. The first solar panel array positionable against the first side surface and the second solar panel array positionable against the third side surface. A plurality of notches are formed in at least one of the side edges of both the solar panel arrays. A first frame is slidably mounted to the first side surface of the spacecraft around the first solar array panel and a second frame is slidably mounted to the third side surface of the spacecraft around the second solar panel array. A plurality of first tabs extend from the first frame over the first solar panel array with the number of first tabs corresponding to the number of notches on the first solar panel array and the first tabs releasably restraining the first solar panel array. A plurality of second tabs extend from the second frame over the second solar panel array with the number of second tabs corresponding to the number of notches on the second solar panel array and the second tabs releasably restraining the second solar panel array. First spring means urge the first frame in a direction generally away from the solar array drive assembly and second spring means urge the second frame in a direction generally away from the solar array drive assembly. First release means holds the first frame against the force of the first spring means and second release means holds the second frame against the force of the second spring means. Upon initiation of deployment, both the release means disintegrate allowing the both spring means to slidably urge the frames in a general direction away from the solar array drive assembly thereby aligning the notches with the tabs and releasing the solar panel arrays from against the spacecraft.

BRIEF DESCRIPTION OF THE DRAWINGS

FIG. 1A is a cross-sectional perspective view of the frame, a pair of holding elements attached to the frame, and a pair of tabs;

FIG. 5 is an exploded perspective view illustrating the deployable and tracked solar array mechanism for nano-satellites, constructed in accordance with the present invention, with the solar panel arrays and the spacecraft;

FIG. 6 is a perspective view illustrating the deployable and tracked solar array mechanism for nano-satellites, constructed in accordance with the present invention, with the mechanism mounted to the spacecraft;

DETAILED DESCRIPTION OF THE PREFERRED EMBODIMENTS

Figure 1:
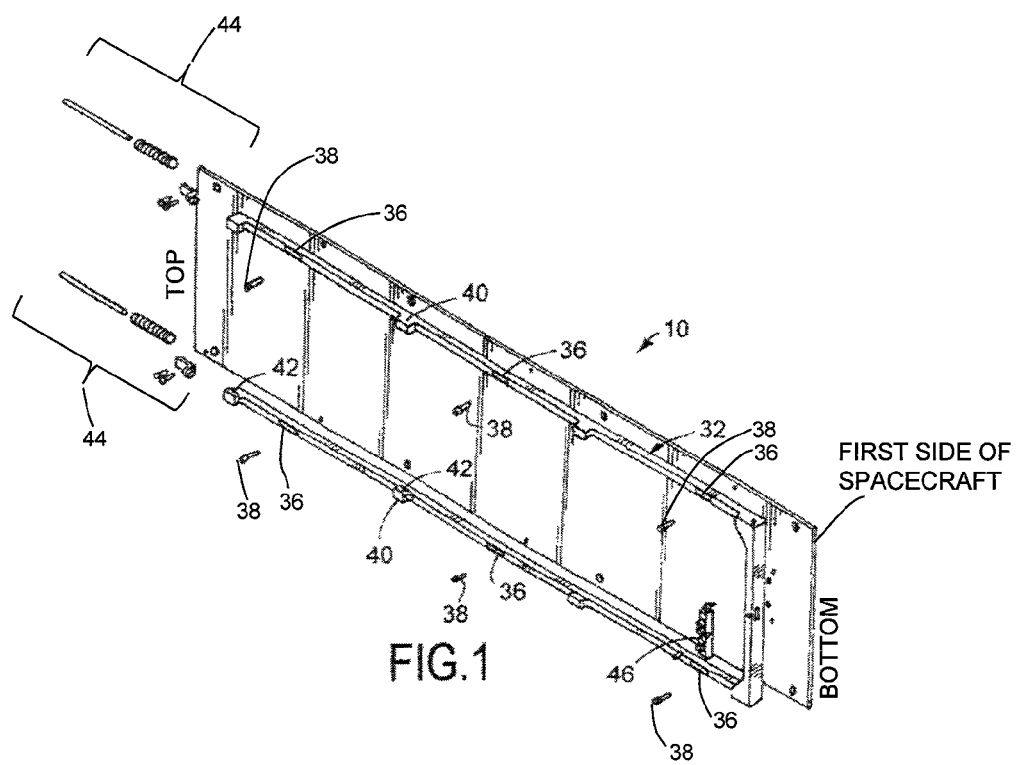
FIG. 1 is an exploded perspective view illustrating a deployable and tracked solar array mechanism for nano-satellites, constructed in accordance with the present invention, for restraining and releasing deployable solar panel arrays on a spacecraft.
Figure 2:
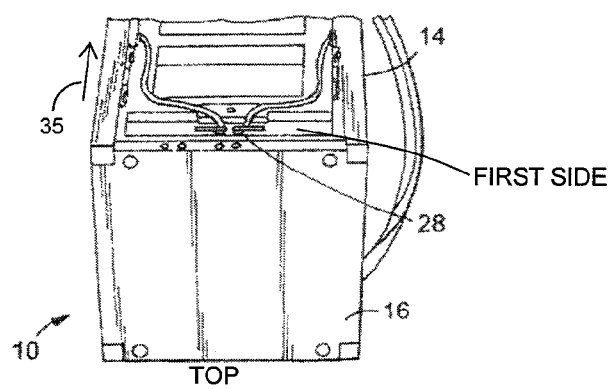
FIG. 2 is a perspective view illustrating the deployable and tracked solar array mechanism for nano-satellites, constructed in accordance with the present invention, with a solar array drive assembly and a root hinge assembly for deploying the solar panel arrays away from the spacecraft.
Figure 3:
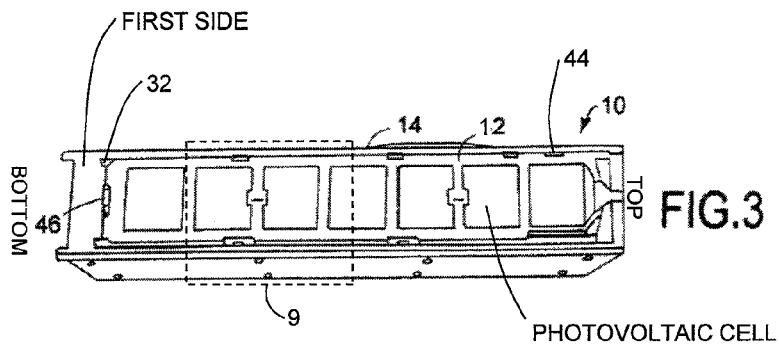
FIG. 3 is a perspective view illustrating the deployable and tracked solar array mechanism for nano-satellites, constructed in accordance with the present invention, with the mechanism mounted to the spacecraft.
Figure 4:
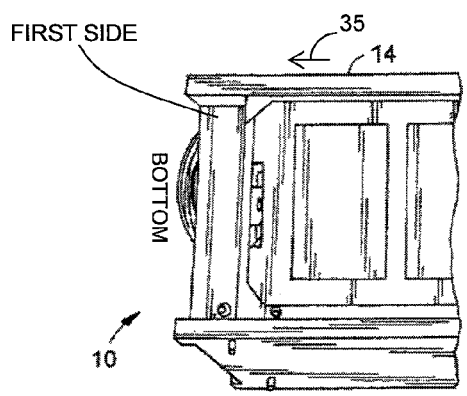
FIG. 4 is another perspective view illustrating the deployable and tracked solar array, mechanism for nano-satellites, constructed in accordance with the present invention, with direction of movement upon melting of meltable release pin.

As illustrated in FIGS. 1, 1A, and 2-10, the present invention is a deployable and tracked solar array mechanism, indicated generally at 10, for restraining and releasing deployable solar panel arrays 12 on a spacecraft 14. The spacecraft 14 used with the mechanism 10 of the present invention is preferably a CubeSat spacecraft 14 although using the mechanism 10 on any type of spacecraft 14 is within the scope of the present invention. In addition, preferably, the solar panel arrays 12 are preferably constructed from a thin graphite-based composite panel stiffness and strength although using other types of solar panel arrays 12 is within the scope of the present invention.

The CubeSat spacecraft 14 has a four side surfaces, a top surface, and a bottom surface. Preferably, each side surface is substantially parallel to each opposite side surface and the top surface is substantially parallel to the bottom surface. Mounted on the top surface is a solar array drive assembly 16. The solar array drive assembly 16 is preferably a simple, self contained, ultra-thin, low-power, stackable single actuator drive system designed to operate on approximately 500 mW of power while articulating the arrays, and less than 1 mW while the actuators and system are inactive. The solar array drive assembly 16 specifically fits in previously wasted payload space, on a typical CubeSat bus, consisting of an approximate 6.5 mm "slice" of the CubeSat bus.

While a specific type of solar array drive assembly 16 has been described for use with the deployable and tracked solar array mechanism 10 of the present invention, it is within the scope of the present invention to utilize any type of solar array drive assembly 16 so long as the solar array drive assembly 16 performs key system functions, rotating the solar panel arrays 12 to keep them optimally oriented with respect to the Sun, and providing a path for power transfer from the solar panel arrays 12 to the CubeSat spacecraft 14.

The solar panel arrays 12 of the deployable and tracked solar array mechanism 10 of the present invention include a first solar panel array 18 and a second solar panel array 20. Each of the first solar panel array 18 and the second solar panel array 20 has a center panel 22, a first panel 24 pivotally attached to one side edge of the center panel 22 with a pivotal attachment 23, and a second panel 26 pivotally attached to the other side edge of the center panel 22 opposite the first panel 24 with a pivotal attachment 23. The center panels 22 of the first solar panel array 18 and the second solar panel array 20 are each pivotally secured to the solar array drive assembly 16 with a root hinge assembly 28, each of which includes one of mounting fasteners 37A, 37B. The two root hinge assemblies 28 operate to deploy the solar panel arrays 12, as described above. Furthermore, each of the edges of the center panels 22 has a series of spaced notches 30 for allowing deployment of the solar panel arrays 12 with the mechanism 10, as will be described in further detail below.

Prior to deployment, the first solar panel array 18 is wrap-folded against the first side surface of the spacecraft 14 and the second solar panel array 20 is wrap-folded against the third side surface of the spacecraft 14 with the center panels 22 of each of the solar panel arrays 12 facing in a generally outward direction. By positioning the center panels 22 in a generally outward direction, complete string of cells for trickle charging is provided without having to deploy the solar panel arrays 12.

While the solar panel arrays 12, i.e., the first solar panel array 18 and the second solar panel array 20, of the deployable and tracked solar array mechanism 10 of the present invention have been described as being tri-fold with three panels, i.e., a center panel 22, a first panel 24, and a second panel 26, it is within the scope of the present invention for the solar panel arrays 12 to have multiple panels, i.e., more than three, flipping away from each other during deployment. Regardless of the number of panels, when the panels are stored, at least a portion of the center panel 22 faces outward and, when deployed, all of the panels face in a desired position to achieve the tracking and power required for the space mission. Furthermore, regardless of the number of panels, deployment springs 31 are positioned between each of the panels. Preferably, the springs are redundant stainless steel torsion rod springs that unfurl the panels of the solar panel arrays 12 during deployment, as will be described in further detail below.

The deployable and tracked solar array mechanism 10 of the present invention maintains the solar panel arrays 12, i.e., the first solar panel array 18 and the second solar panel array 20, against the spacecraft 14 until deployment is desired. The mechanism 10 further comprises a first frame 32 mounted to the first side surface of the spacecraft 14 and a second frame 34 mounted to the third side surface of the spacecraft 14. Each frame 32, 34 has an end member, a first side member substantially perpendicular and connected to one end of the end member, and a second side member connected to the other end of the end member and substantially parallel to the first side member. A plurality of slots 36 are formed in each of the first side member and second side member with a bolt 38 or other fastening mechanism extending through the slot 36 into the spacecraft 14. The interaction of the slots 36 sliding along the bolts 38 allows deployment of the solar panel arrays 12.

Each of the first side member and the second side member of each frame 32, 34 of the deployable and tracked solar array mechanism 10 of the present invention has a series of holding devices 40 spaced therealong. Each holding device 40 extends in a generally outward direction away from the spacecraft 14 and has a frame tab 42 bending inward at an approximately ninety) (90° degree angle and substantially parallel to the spacecraft 14. Each frame tab 42 of each holding device 40 contacts at least a portion of the edges of the center panels 22 of the solar panel arrays 12 adjacent the notches 30 for holding the solar panel arrays 12 against the spacecraft prior 14 to deployment, as will be described in further detail below.

In addition, the deployable and tracked solar array mechanism 10 of the present invention has a pair of spring mechanisms 44 acting against the first side member and the second side member of each frame 32, 34. Preferably, each spring mechanism 44 is a redundant stainless steel compression spring although using other types of spring mechanisms 44 is within the scope of the present invention.

The deployable and tracked solar array mechanism 10 of the present invention further includes a meltable release pin 46 interacting between the end member of each frame 32, 34 and the spacecraft 14. The release pin 46 maintains the position of each frame 32, 34 relative to the spacecraft 14 against the force of the spring mechanisms 44. When the deployment event is initiated by a command to burn the release pin 46, the disintegration of the release pin 46 allows the spring mechanisms 44 to urge each of the frames 32, 34 in a slidable direction, indicated by arrow 35, opposite the solar array drive assembly 16 along the sides of the spacecraft 14. This type of release event is preferably not instantaneous making the release event low shock and immune from spurious spikes of current due to Electro Static Discharge (ESD). Furthermore, the release pin 46 is lightweight, typically weighing less than one (1) gram, is easy to reset by replacing the release pin 46.

Upon complete movement of the frames 32.34 of the deployable and tracked solar array mechanism 10 of the present invention, to the movement capacity of the spring mechanisms 44, the notches 30 in the edges of the center panels 22 of the stowed solar panel arrays 12 align with the holding devices 40. Being free from constraint by movement of the frames 32, 34, the spring-powered root hinge 28 interacting with the solar array drive system 16 rotates the solar panel arrays 12 in a general direction away from the first side surface and the third side surface of the spacecraft 14, respectively.

Figure 7:
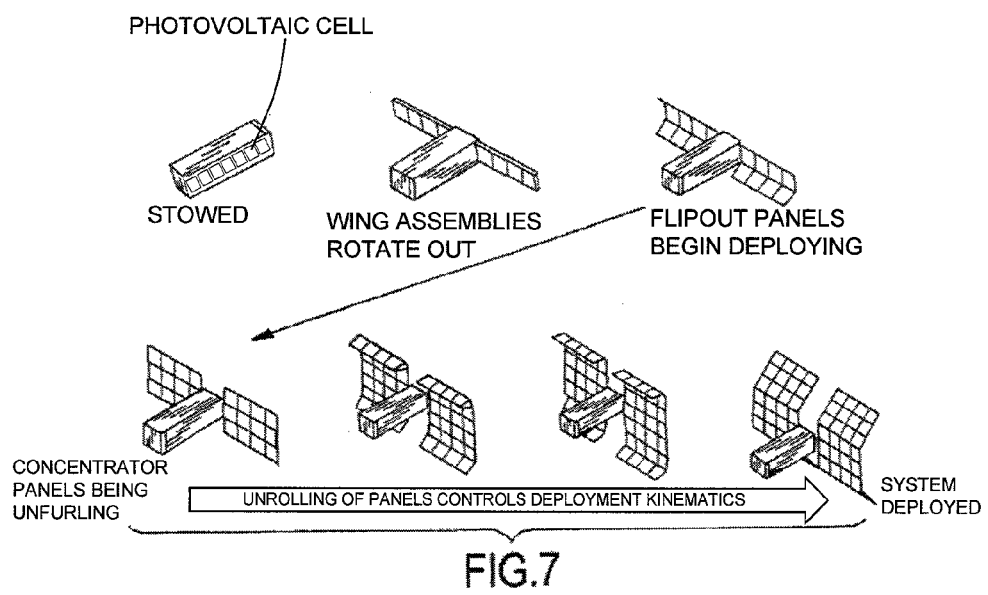
FIG. 7 illustrates a deployment sequence of the solar panel arrays for use with the deployable and tracked solar array mechanism for nano-satellites, constructed in accordance with the present invention.
Figure 8:
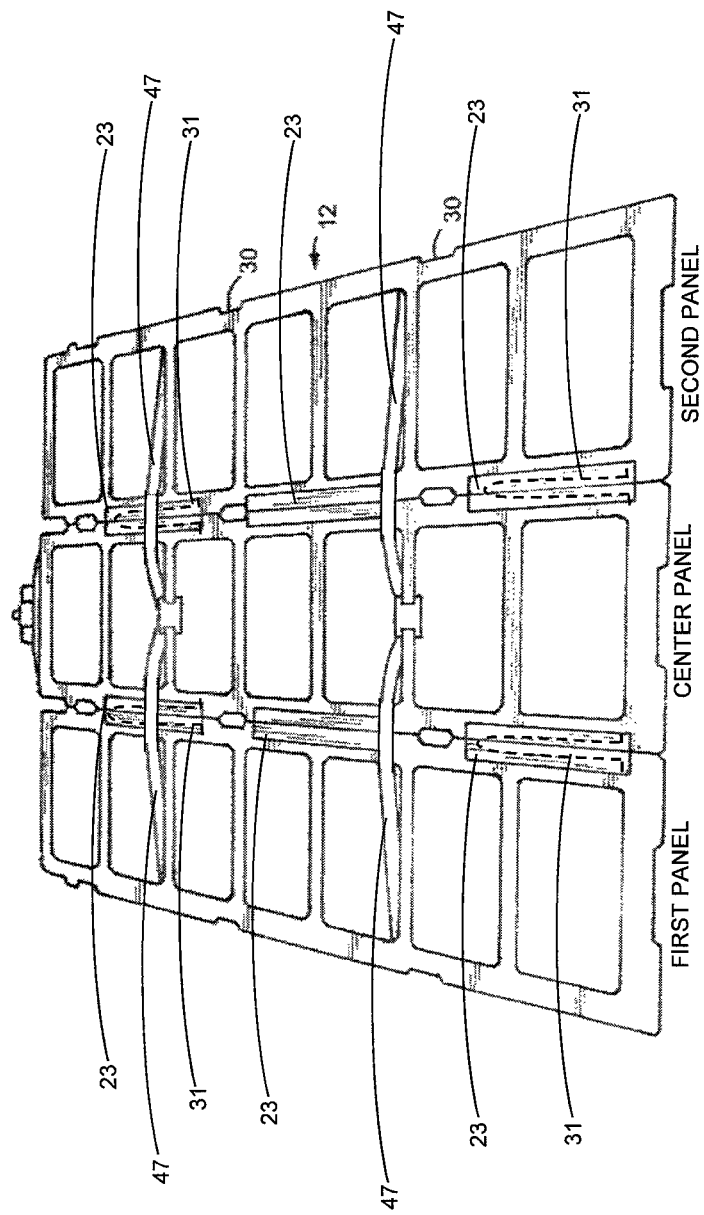
FIG. 8 is a perspective view illustrating the solar panel array for nano-satellites, constructed in accordance with the present invention, with small folded braces deployed on the back sides (non-cell side) of the solar panel array.
Figure 9:
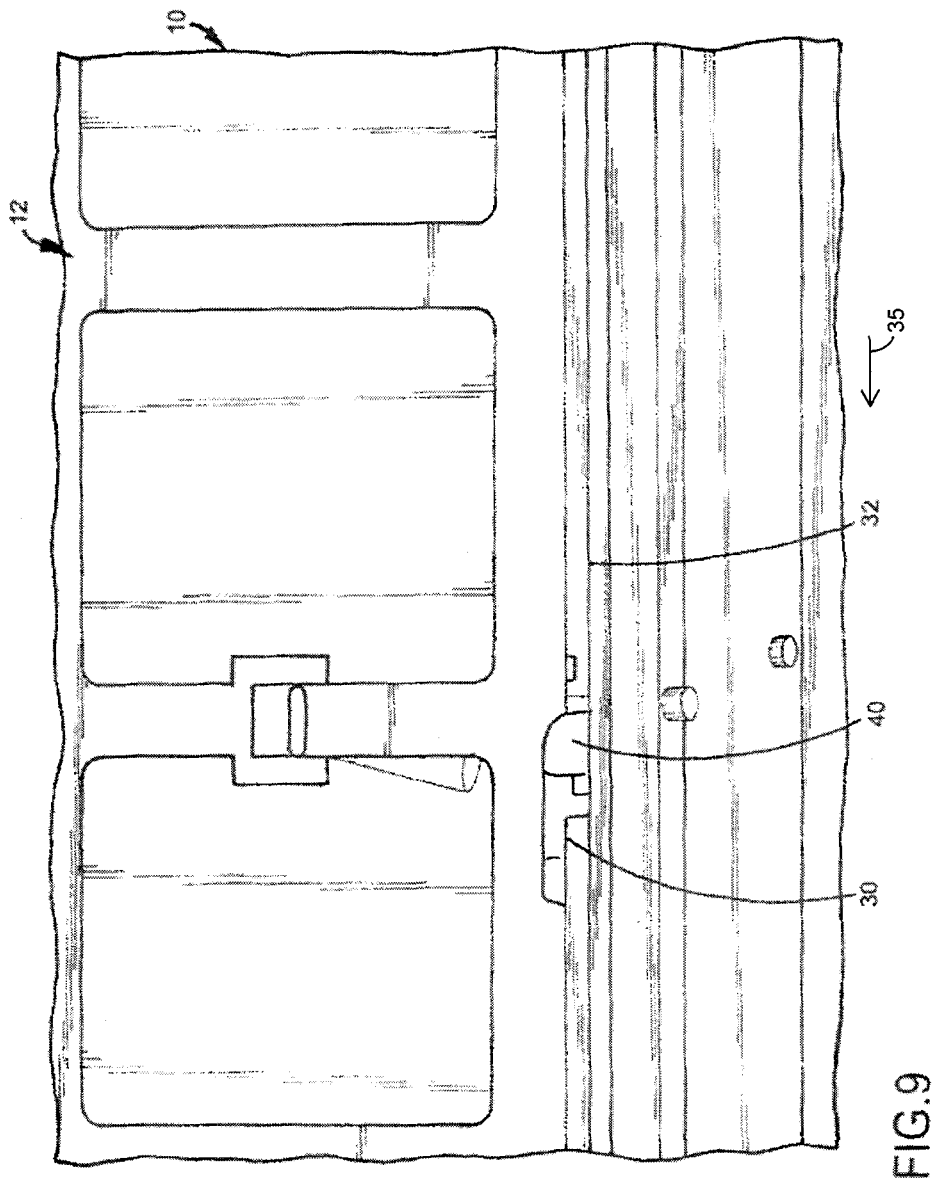
FIG. 9 is a close-up perspective view illustrating a portion of the deployable and tracked solar array mechanism for nano-satellites 9 shown in FIG. 3, constructed in accordance with the present invention.
Figure 10:
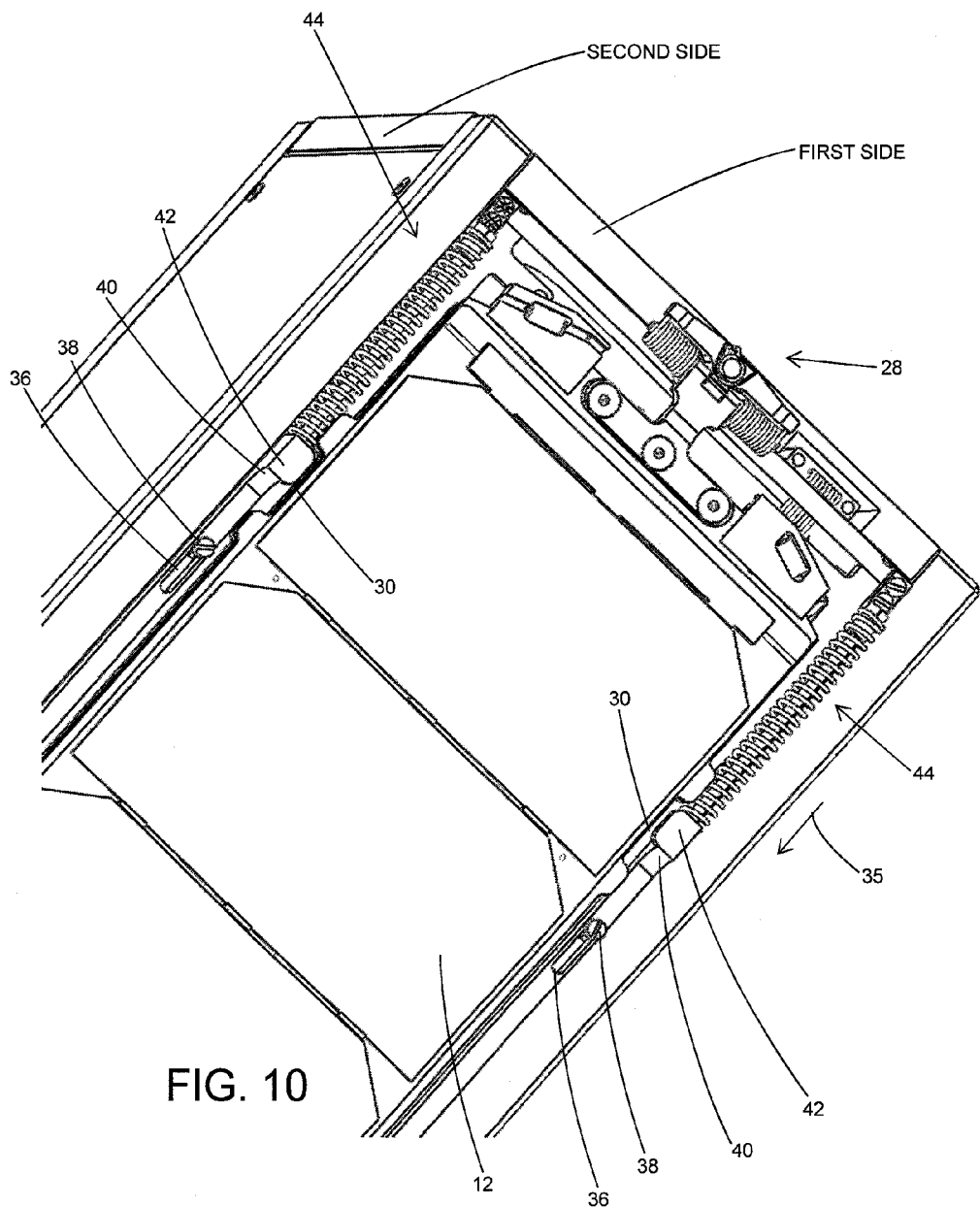
FIG. 10 is a close-up, perspective view illustrating a folded solar panel array positioned adjacent to the first side of a nano-satellite, root hinge assembly, spring mechanisms, a portion of the frame that has a pair of tabs and a pair of slots that allow the frame to be slidably mounted to the first side of the nano-satellite, and the tabs of the frame aligned with pairs of notches in the folded solar panel array to allow deployment of the solar panel array (as would occur after the release device has been released to allow the frame to be displaced so the tabs and notches move from an unaligned state to an aligned state).

As the solar panel arrays 12 of the deployable and tracked solar array mechanism 10 of the present invention reach approximately eighty (80°) degrees of deployment rotation from the spacecraft 14, the solar panel arrays 12 begin to unfurl by spring energy. Simultaneously, small folded braces 47 deploy on the back sides (non-cell side) of the solar panel arrays 12 providing the solar panel arrays 12 with deployed stiffness and position accuracy. The preferred deployment sequence for the solar panel arrays 12 is illustrated in FIG. 7.

The deployable and tracked solar array mechanism 10 of the present invention securely and releasably restrains the solar panel arrays 12 during liftoff, flight, and positioning of the spacecraft 14. In addition, the mechanism 10 reliably releases the solar panel arrays 12 for deployment during orbit.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A deployable and tracked solar array mechanism for restraining and releasing deployable solar panel arrays on a spacecraft, the spacecraft having a first side surface, a second side surface, a third side surface opposite the first side surface, a fourth side surface opposite the second side surface, a top surface, and a bottom surface, the mechanism comprising:

a solar array drive assembly mountable to the top side surface of the spacecraft;

a first solar panel array having a first center panel, a first panel pivotally attached to one side edge of the first center panel, and a second panel pivotally attached to the other side edge of the first center panel opposite the first panel, the first center panel pivotally attached to the solar array drive assembly, the first solar panel array positionable against the first side surface of the spacecraft;

at least one first notch formed in at least one of the side edges of each of the first, second, and first center panels, the notches aligning with one another when the panels are folded;

a first frame slidably mountable to the first side surface of the spacecraft;

at least one tab extending from the first frame and over the first solar panel array when the first, second, and first center panels are folded and in an undeployed position substantially parallel and adjacent to the first frame, the at least one tab releasably restraining the first solar panel array in a folded and undeployed position substantially parallel and adjacent to the first frame;

a first spring actuator for urging the first frame from a first position at which the at least one tab is unaligned with the at least one first notch in each of the first, second, and first center panels when the first, second, and first center panels are in a folded and undeployed position substantially parallel and adjacent to the first frame to a second position at which the at least one tab is aligned with the at least one first notch in each of the first, second, and first center panels to allow the first, second, and first center panels to deploy away from the first frame; and a first release mechanism, wherein the first release mechanism is capable of being in a first state in which the first spring actuator has stored energy and the first frame is in the first position and a second state in which the first spring actuator is allowed to apply at least some of the stored energy to the first frame to move the first frame from the first position to the second position, wherein the first release mechanism disintegrates in transitioning from the first state to the second state.

2. The mechanism of claim 1 wherein the solar array drive assembly is configured to perform the key system functions of rotating the first solar panel array to maintain optimal orientation of the first solar panel array with respect to the Sun and to provide a path for power transfer from the at least one solar panel array to the spacecraft.

3. The mechanism of claim 1 wherein the first center panel is pivotally secured to the solar array drive assembly with a root hinge assembly.

4. The mechanism of claim 1 wherein, when the first, second, and first center panels are in the folded and undeployed position substantially parallel and adjacent to the first frame, the at least one tab engages a first face of the first center panel and the first and second panels are wrap-folded adjacent to a second face of the first center panel that is separated from and substantially parallel to the first face of the first center panel, the first face of the first center panel having at least one photovoltaic cell.

5. The mechanism of claim 1 and further comprising:
a first panel spring extending between the first panel and the first center panel for biasing the first and first center panels from a folded position into an open position; and
a second panel spring extending between the second panel and the first center panel for biasing the second and first center panels from a folded position into an open position.

6. The mechanism of claim 1 wherein the first frame has a first end member, a first side member substantially perpendicular and connected to one end of the first end member, and a second side member connected to the other end of the first end member and substantially parallel to the first side member, a plurality of slots are formed in each of the first side member and second side member, wherein each of the plurality of slots being adapted to receive a fastener for attaching the first frame to a spacecraft while allowing the first frame to be moved from the first position to the second position.

7. The mechanism of claim 6 and further comprising:
a plurality of spaced holding devices along each of the first side member and the second side member of the first frame, each holding device corresponding to a first notch;
wherein the at least one tab comprises a plurality of tabs;
wherein each one of the plurality of tabs is mounted on one of the plurality of spaced holding devices;
wherein when the first frame is operatively attached to a spacecraft, each of the holding devices extending in a generally outward direction away from the spacecraft and each of the tabs extending inward at an approximately ninety (90°) degree angle and substantially parallel to the spacecraft, each tab of the plurality of tabs contacting at least a portion of the edges of the first center panel adjacent the corresponding first notch when the panels are in the stowed configuration against the first side of the spacecraft.

8. The mechanism of claim 6 wherein the first spring actuator includes first and second springs that each have a first spring end that is operably attachable to the spacecraft and a second spring end, wherein the second spring end of the first spring is operatively attached to the first side member of the first frame and the second spring end of the second spring is operatively attached to the second side member of the first frame.

9. The mechanism of claim 1 wherein the first release mechanism comprises a meltable release pin.

10. The mechanism of claim 1 and further comprising:
braces operatively engaging the first, second, and first center panels to provide the first solar panel array with deployed stiffness and position accuracy.

11. The mechanism of claim 1 and further comprising:
a second solar panel array having a second center panel, a third panel pivotally attached to one side edge of the second center panel, and a fourth panel pivotally attached to the other side edge of the second center panel opposite the third panel, the second center panel pivotally attached to the solar drive assembly, the second solar panel array positionable against the third side surface of the spacecraft;
at least one second notch formed in at least one of the side edges of each of the third, fourth, and second center panels, the notches aligning with one another when the panels are folded;
a second frame slidably mountable to the third side surface of the spacecraft;
at least one second tab extending from the second frame and over the second solar panel array when the third, fourth, and second center panels are folded an in an undeployed position substantially parallel and adjacent to the second frame, the at least one second tab releasably restraining the second solar panel array in a folded and undeployed position substantially parallel and adjacent to the second frame;
a second spring actuator for urging the second frame from a first position at which the at least one second tab is unaligned with the at least one second notch in each of the third, fourth, and second center panels when the third, fourth, and second center panels are in a folded and undeployed position substantially parallel and adjacent to the second frame to a second position at which the at least one second tab is aligned with the at least one second notch in each of the third, fourth, and second center panels to allow the third, fourth, and second center panels to deploy away from the second frame; and
a second release mechanism, wherein the second release mechanism is capable of being in a first state in which the second spring has stored energy and the second frame is in the first position and a second state in which the second spring is allowed to apply at least some of the stored energy to the second frame to move the second frame from the first position to the second position, wherein the second release mechanism disintegrates in transitioning from the first state to the second state.

12. A method for restraining and releasing deployable solar panel arrays on a spacecraft, the spacecraft having a first side surface, a second side surface, a third side surface opposite the first side surface, a fourth side surface opposite the second side surface, a top surface, and a bottom surface, the method comprising:
mounting a solar array drive assembly to the top side surface of the spacecraft;
providing a first solar panel array having a first center panel;
pivotally attaching a first panel to one side edge of the first center panel;
pivotally attaching a second panel to the other side edge of the first center panel opposite the first panel;
pivotally attaching the first center panel to the solar array drive assembly;
positioning the first solar panel array with the first center, first, and second panels in a folded state;
wherein at least one side edge of each of the first center panel, first panel, and second panel defining at least one notch, the notches aligning with one another when the first center, first, and second panels are in a folded state;

slidably mounting a first frame with at least one first tab to the first side surface of the spacecraft;

positioning the at least one first tab from the first frame over the first solar panel array with the first center, first, and second panels in the folded state so that the first solar panel array is held adjacent to the first side of the spacecraft;

biasing the first frame with a potential force, generated using a first spring, in a direction towards the bottom side of the spacecraft;

holding the first frame in a first position and against the potential force of the first spring;

releasing the hold on the first frame to cause, using the first spring, the first frame to slide from the first position to a second position towards the bottom side of the spacecraft so that the at least one notch defined by the at least one side edge of each of the first center, first, and second panels aligns with the at least one first tab and the first solar panel array can be deployed away from the first side surface of the spacecraft.

13. A deployable and tracked solar array mechanism for restraining and releasing deployable solar panel arrays on a spacecraft, the spacecraft having a first side surface, a second side surface, a third side surface opposite the first side surface, a fourth side surface opposite the second side surface, a top surface, and a bottom surface, the mechanism comprising:

a solar array drive assembly mountable to the top side surface of the spacecraft;

a first solar panel array and a second solar array panel, each solar array panel having a center panel, a first panel pivotally attached to one side edge of the center panel, and a second panel pivotally attached to the other side edge of the center panel opposite the first panel, the center panels pivotally attached to opposite sides of the solar array drive assembly, the first solar panel array positionable against the first side surface of the spacecraft, the second solar panel array positionable against the third side surface of the spacecraft;

a plurality of notches formed in at least one of the side edges of each of the first, second, and center panels of each of the first and second solar panel arrays, the notches of the first solar panel array aligning with one another when the panels of the first solar panel array are folded, the notches of the second solar panel array aligning with one another when the panels of the second solar panel array are folded;

a first frame slidably mountable to the first side surface of the spacecraft;

a second frame slidably mountable to the third side surface of the spacecraft;

a plurality of first tabs extending from the first frame and over the first solar panel array when the first, second, and center panels are folded and in an undeployed position substantially parallel and adjacent to the first frame, the number of first tabs corresponding to the number of notches in each of the first, second, and center panels of the first solar panel array, the first tabs releasably restraining the first solar panel array in a folded and undeployed position substantially parallel and adjacent to the first frame;

a plurality of second tabs extending from the second frame and over the second solar panel array when the first, second, and center panels are folded and in an undeployed position substantially parallel and adjacent to the second frame, the number of second tabs corresponding to the number of notches in each of the first, second, and center panels of the second solar panel array, the second tabs releasably restraining the second solar panel array in a folded and undeployed position substantially parallel and adjacent to the second frame;

a first spring actuator for urging the first frame from a first position at which the plurality of first tabs are unaligned with the notches in each of the first, second, and center panels of the first solar panel array when the first, second, and center panels are in a folded and undeployed position substantially parallel and adjacent to the first frame to a second position at which the plurality of first tabs are aligned with the notches in each of the first, second, and center panels to allow the first, second, and center panels to deploy away from the first frame;

a second spring actuator for urging the second frame from a first position at which the plurality of second tabs are unaligned with the notches in each of the first, second, and center panels of the second solar panel array when the first, second, and center panels are in a folded and undeployed position substantially parallel and adjacent to the second frame to a second position at which the plurality of second tabs are aligned with the notches in each of the first, second, and center panels to allow the first, second, and center panels to deploy away from the second frame;

a first release mechanism, wherein the first release mechanism is capable of being in a first state in which the first spring actuator has stored energy and the first frame is in the first position and a second state in which the first spring actuator is allowed to apply at least some of the stored energy to the first frame to move the first frame from the first position to the second position, wherein the first release mechanism disintegrates in transitioning from the first state to the second state;

a second release mechanism, wherein the second release mechanism is capable of being in a first state in which the second spring actuator has stored energy and the second frame is in the first position and a second state in which the second spring actuator is allowed to apply at least some of the stored energy to the second frame to move the second frame from the first position to the second position, wherein the second release mechanism disintegrates in transitioning from the first state to the second state.

14. The mechanism of claim 13 wherein, when the first, second, and center panels of each of the first and second solar panel arrays are respectively in the folded and undeployed position substantially parallel and adjacent to the first and second frames, the plurality of first and second tabs respectively engage a first face of the center panel and the first and second panels are wrap-folded adjacent to a second face of the center panel that is separated from and substantially parallel to the first face of the center panel, the first face of the center panel having at least one photovoltaic cell.

15. The mechanism of claim 13 and further comprising:

a first panel spring extending between the first panel and the center panel of each of the first and second solar panel arrays for biasing the first and center panels from the folded position into an open position; and a second panel spring extending between the second panel and the center panel of each of the first and second solar panel arrays for biasing the second and center panels from the folded position into an open position.

16. The mechanism of claim 13 wherein each of the first and second frames has a first end member, a first side member substantially perpendicular and connected to one end of the first end member, and a second side member connected to the other end of the first end member and substantially parallel to the first side member, a plurality of slots are formed in each of the first side member and second side member, wherein each of the plurality of slots being adapted to receive a fastener for attaching the respective first and second frame to a spacecraft while allowing the first and second frames to be respectively moved from the first position to the second postion.

17. The mechanism of claim 16 and further comprising:
a plurality of spaced holding devices along each of the first side member and the second side member of each of the first and second frames, wherein each holding device associated with the first frame corresponding to one of the plurality of notches and supporting one of the plurality of first tabs, wherein each holding device associated with the second frame corresponding to one of the plurality of notches and supporting one of the plurality of second tabs, wherein when the first and second frames are operatively attached to a spacecraft, each of the holding devices extending in a generally outward direction away from the spacecraft and each of the tabs extending inward at an approximately ninety (90°) degree angle and substantially parallel to the spacecraft, each tab contacting at least a portion of an edge of the center panel adjacent to one of the plurality of notches when the panels are in a stowed configuration against the relevant one of the first and third sides of the spacecraft.

18. The mechanism of claim 13 wherein the first and second spring actuators each including a pair of springs that each have a first spring end that is operably attachable to the spacecraft and a second spring end, wherein the second spring end of the one of the pair of springs is operatively attached to the first side member of the respective one of the first and second frames and the second spring end of the other of the pair of springs is operatively attached to the second side member of the respective one of the first and second frames.

19. The mechanism of claim 16 wherein the first and second release mechanisms each include a meltable release pin.

20. The mechanism of claim 16 and further comprising:
braces operatively engaging the first, second, and center panels of each of the first and second solar panel arrays to provide the first and second solar panel arrays with deployed stiffness and position accuracy.

* * * * *